Patented Nov. 6, 1945

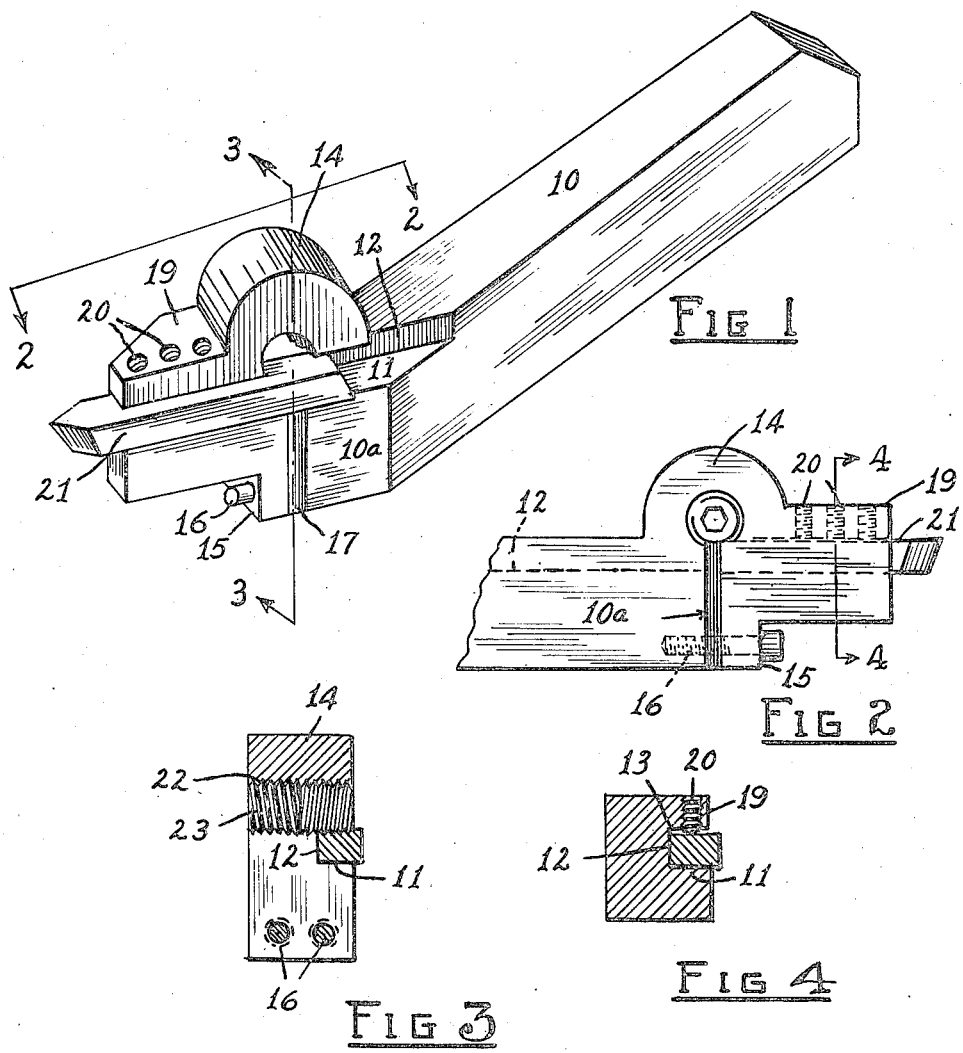

2,388,522

UNITED STATES PATENT OFFICE 2,388,522

TOOL SUPPORT

George S. Boyd, East Cleveland, Ohio

Application August 17, 1944, Serial No. 549,949

7 Claims. (Cl. 29—97.5)

This invention relates to tool holders and has for its general purpose and object to provide a construction of tool holder which will eliminate the "chattering" of the cutting tool supported thereby during the operation of such tool.

Further and more limited objects of the invention will be set forth in the detailed description of my invention as illustrated in the drawing forming part hereof, wherein Fig. 1 represents a perspective front side elevational view of a tool holder constructed in accordance with my invention and having a cutting tool mounted therein; Fig. 2 a rear side elevational view of the operating end portion of the tool holder, corresponding to the line 2—2 of Fig. 1; Fig. 3 a detail in section corresponding to the line 3—3 of Fig. 1; and Fig. 4 a detail in section corresponding to the line 4—4 of Fig. 2.

Describing by reference characters the parts illustrated in the drawing, 10 denotes the body of the shank of a tool holder, the front or operating end of which is shown as deflected from the body portion proper. The forward end of the tool holder constitutes a device for receiving and clamping a tool, being provided with a seat for the tool and being separated at its lower portion from the forward end of the shank 10 by a slot while connected at its upper portion with the said shank by means of a heavy integral spring arch. The seat for the tool is shown as a slot which extends from the front face of the operating or forward end of the tool into the body above the joint between the lower portion of this operating end and the adjacent portion of the shank and partly through the portion of the operating end which is above such joint. The seat for the tool is shown herein as a rectangular slot, the bottom wall of which is indicated at 11, the back wall at 12, and the top wall at 13, and the slot is overhung at its rear by the rear portion of the arch, said arch being indicated at 14. The bottom of the operating portion of the tool holder is provided with a downwardly extending ledge or heavy flange 15 at its rear for the reception of headed screw bolts 16. 17 denotes a cushion of leather or other suitable compressible and shock absorbing material which is inserted in the slot formed between the lower portion of the operating portion of the tool holder and the opposed portion 10ª of the shank 10. The headed screw bolts 16 extend through the ledge or flange 15 and through the cushion and are threaded into the portion 10ª of the shank.

Extending forwardly from the arch 14 is a clamping member 19, formed with the body of the tool support, and the bottom of which constitutes the upper wall 13 of the slot in which the tool is inserted. This clamping member 19 is provided with threaded openings for the reception of clamping screws 20, such as are known to the trade as "Allen" screws and which are adapted to engage the upper surface of a tool 21 which is inserted within the slot. The tool shown herein is of a type such as is utilized for the purpose of cutting threads on bolt or screw stock.

The arch 14 and the cooperating rear side portion of the tool holder therebeneath are provided with a threaded bore 22 within which a screw 23 may be threaded, the said screw also being of the type known to the trade as an "Allen" screw.

With the parts constructed and arranged as described, it will be seen that the cushion 17 operates to eliminate the "chattering" of the tool supported thereby during the operation of such tool. By the adjustment of the screws 16, the cushioning effect of the element 17 may be varied as desirable. With the screw 23 removed, the arch 15 operates as a very stiff spring and enables the whole outer or forward end of the tool holder to "give," when necessary, thereby preventing injury to the work.

Where coarse cutting is employed, the screw 23 will be inserted in place in order to impart necessary stiffness to the operating end of the tool holder. When so inserted, it also interferes with the free action of the cushion 17, preventing the latter from being compressed by the cutting operation except at its extreme lower end.

For convenience of description, the parts will be assumed to be in the positions which they occupy in Fig. 1 of the drawing and the terms "top" and "bottom," "front" and "rear" and "forward" and "rearward" will be used to designate the positions and relations of the elements to one another but without thereby limiting the use of my invention to the particular positions of the parts as shown in said view.

My tool holder can be used on a shaper, a plane or a lathe. As shown herein, it is especially designed for thread cutting.

Having thus described my invention, what I claim is:

1. A tool support comprising a shank having at its forward end a device for receiving and clamping a tool in place, the tool-receiving- and-clamping device comprising an integral extension of the top of the said shank having a seat formed therein for the reception of a tool, the lower portion of said device being spaced from the lower portion of the shank by an upwardly extending slot, a cushion of yieldable and compressible material in said slot and adapted to be engaged by the opposed walls of said slot, and pressure-adjusting means connecting the portions of the device and shank on opposite sides of said slot, thereby to vary the responsiveness of the cushion to fluctuations in pressure applied thereto during the operation of the tool.

2. A tool support comprising a shank having at its forward end a device for receiving and clamping a tool in place, the tool-receiving-and-clamping device comprising an integral extension of the top of the said shank having a seat formed therein for the reception of a tool, the lower portion of said device being spaced from the lower portion of the shank by an upwardly extending slot, a cushion of yieldable and compressible material in said slot and adapted to be engaged by the opposed walls of said slot, pressure-adjusting screws connecting the portions of the device and shank on opposite sides of said slot and extending through the said cushion, the seat for the tool being located above the said cushion, and means for anchoring a tool within the said seat.

3. A tool support comprising a shank having at its forward end a device for receiving and clamping a tool in place, the tool-receiving-and-clamping device comprising an arch integral with the top of the said shank and an upper clamping member extending forwardly from said arch, the said device also having a seat therein for a tool below the said clamping member, and clamping screws mounted in said clamping member and adapted to engage a tool within the said seat.

4. In the tool support recited in claim 3, the arch and the portion of the tool-receiving-and-clamping device therebelow being provided with a bore threaded thereinto from the rear surface of the said device, and a threaded member adapted to be threadably inserted into the rear of the said bore.

5. A tool support comprising a shank having at its forward end a device for receiving and clamping a tool in place, the tool-receiving-and-clamping device comprising an arch integral with the top of the said shank and an upper clamping member extending forwardly from said arch, the said device also having a seat extending thereinto from the front thereof below the said clamping member, the rear of the clamping device which is below the seat being provided with a transverse wall extending thereacross opposed to a wall on the forward end of the shank and separated therefrom by an upwardly extending slot, a cushion of compressible material inserted within said slot, clamping screw bolts mounted in said flange and threaded into the wall on the forward end of the shank, and clamping screws mounted in the said clamping member and adapted to engage the upper surface of a tool inserted within the said seat.

6. A tool support comprising a shank having at its forward end a device for receiving and clamping a tool in place, the tool-receiving-and-clamping device comprising an arch integral with the top of the said shank and an upper clamping member extending forwardly from said arch, the said device also having a seat therein for a tool and the said device having adjacent to its rear end a downwardly extending ledge or flange, the rear end of the portion of the clamping device which is below the seat being provided with a transverse wall opposed to a wall on the forward end of the shank and spaced therefrom by an upwardly extending slot, a cushion of compressible material inserted within said slot, clamping screws mounted in said flange and extending through the cushion and being threaded into the forward end of the shank, screw bolts mounted in the said clamping member adapted to engage the upper surface of a tool inserted within the said seat, the interior of the arc and the rear side portion of the tool-receiving-and-clamping device having jointly an internally threaded bore, and an externally threaded member adapted to be inserted within and to be adjustably mounted within the said bore.

7. In the tool support set forth in claim 2, a portion of the device for receiving and clamping the tool in place and which is below the seat for the tool having adjacent to its rear end a downwardly extending ledge or flange and the lower portion of the slot being formed between the said ledge or flange and the portion of the shank which is opposed thereto and the pressure adjusting screw bolts extending through the said ledge or flange.

GEORGE S. BOYD.